(12) United States Patent
Devadhar

(10) Patent No.: US 8,838,526 B2
(45) Date of Patent: Sep. 16, 2014

(54) SYSTEMS AND METHODS FOR SUPPORTING TRANSACTIONAL MESSAGE HANDLING

(75) Inventor: Vijayanth Devadhar, Fremont, CA (US)

(73) Assignee: salesforce.com, inc., San Francisco, CA (US)

(*) Notice: Subject to any disclaimer, the term of this patent is extended or adjusted under 35 U.S.C. 154(b) by 78 days.

(21) Appl. No.: 13/286,726

(22) Filed: Nov. 1, 2011

(65) Prior Publication Data

US 2012/0330913 A1 Dec. 27, 2012

Related U.S. Application Data

(60) Provisional application No. 61/501,069, filed on Jun. 24, 2011.

(51) Int. Cl.
*G06F 7/00* (2006.01)
*G06F 17/00* (2006.01)
*G06F 17/30* (2006.01)

(52) U.S. Cl.
CPC ................ *G06F 17/30362* (2013.01)
USPC ........................................................ 707/607

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |

(Continued)

OTHER PUBLICATIONS

Autocommit [date unknown, but captured on May 6, 2013], http://en.wikipedia.org/wiki/Autocommit.*

(Continued)

*Primary Examiner* — Jason Liao
(74) *Attorney, Agent, or Firm* — Blakely, Sokoloff, Taylor & Zafman

(57) ABSTRACT

In accordance with embodiments disclosed herein, there are provided methods, systems, and apparatuses including, for supporting transactional message handling in an on-demand service environment including, for example: enqueuing a message specifying a transaction to be processed via a host organization; inserting a row into a database of the host organization associating the message with a status of pending, wherein the row is autocommitted to the database upon insertion; updating the status for the row to ready if a commit operation for the transaction is initiated; requesting a lock on the row; and performing final processing for the transaction based on the status for the message and based further on whether the lock is obtained for the row. Final processing may include, for example, a transaction roll back, a transaction commit, a transaction requeue, a termination of transaction processing, or an orphaned transaction clean up.

26 Claims, 12 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,155 B1* | 8/2004 | Stegelmann ............ 1/1 |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0148308 A1* | 7/2004 | Rajan et al. ............ 707/102 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

OTHER PUBLICATIONS

Bouman, MySQL: Transactions and Autocommit 2007, blogspot.com, http://rpbouman.blogspot.com/2007/02/mysql-transactions-and-autocommit.html.*

IBM i Information Center 2009, IBM, http://pic.dhe.ibm.com/infocenter/iseries/v6r1m0/index.jsp?topic=/rzaha/transaut.htm.*

Autocommit Transactions [date unknown, but captured on May 6, 2013], msdn.microsoft.com, http://msdn.microsoft.com/en-us/library/ms187878%28v=sql.105%29.aspx.*

How to determine the version and edition of SQL Server and its components [date unknown], http://support.microsoft.com/kb/321185.*

Terminate [Captured on Oct. 6, 2013], dictionary.com, http://dictionary.reference.com/browse/terminate.*

Using Commit Bits to Reduce Locking n Transaction Processing System, IBM Technical Disclosure bulletin Sep. 1993, Issue 9A, pp. 263-266.*

* cited by examiner

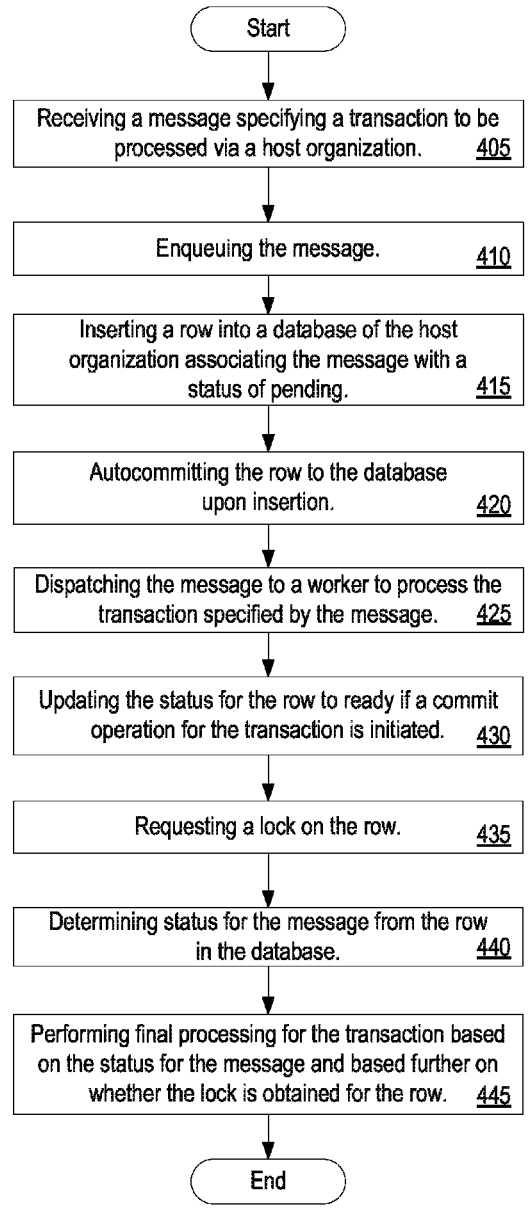

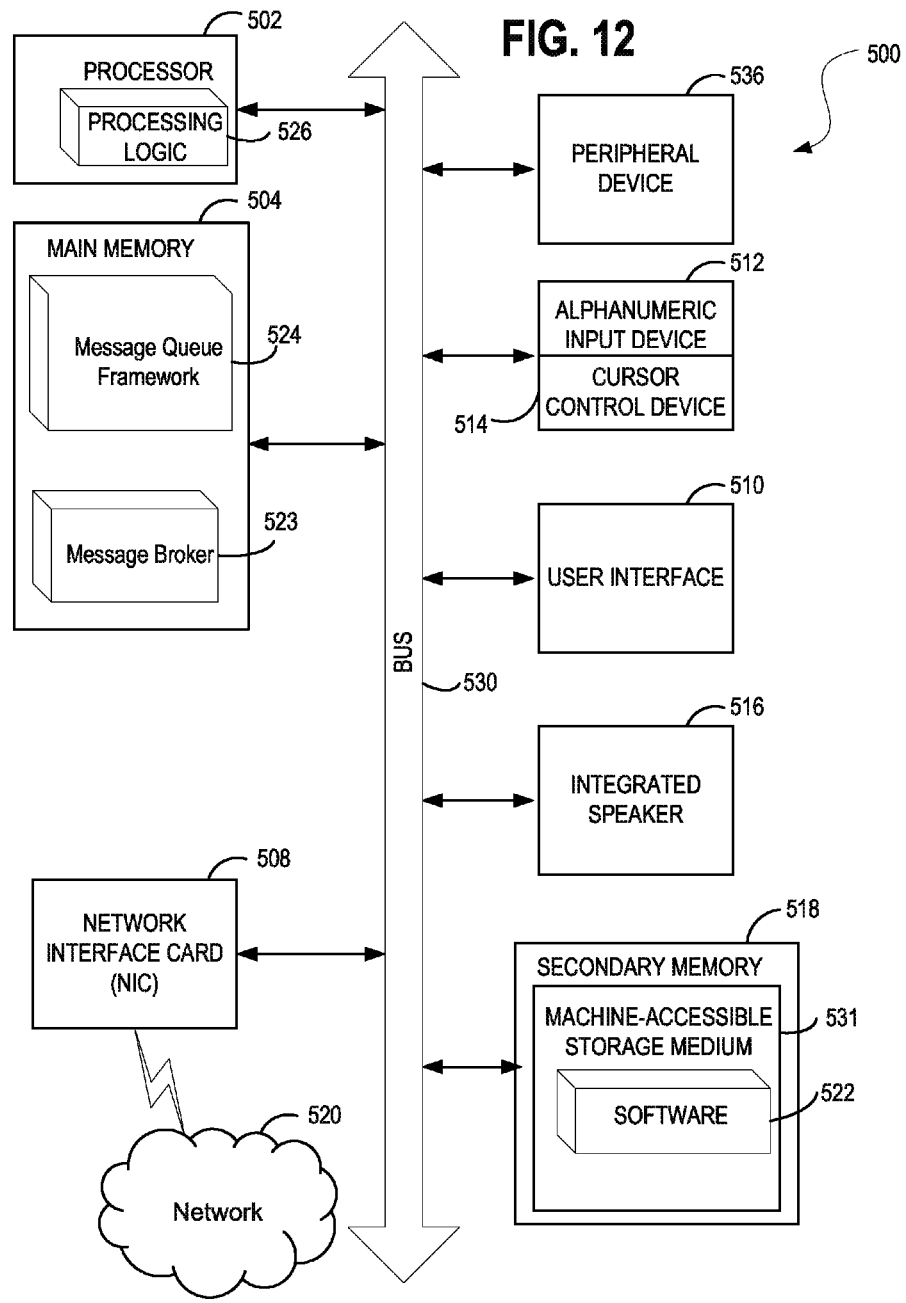

SYSTEMS AND METHODS FOR SUPPORTING TRANSACTIONAL MESSAGE HANDLING

CLAIM OF PRIORITY

This application is related to, and claims priority to, the provisional utility application entitled "SYSTEMS AND METHODS FOR SUPPORT TRANSACTIONAL MESSAGE HANDLING," filed on Jun. 24, 2011, having an application number of 61/501,069, the entire contents of which are incorporated herein by reference

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to methods and systems for supporting transactional message handling in an on-demand service environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

With respect to modern database systems, the concept of atomicity represents the idea that transactions having multiple sub-parts either fully complete, or be fully rejected. Consider for example a bank transaction. A successful transaction may include (1) a withdrawal from a first account and (2) a credit to a second account. However, if a problem were to occur during the transaction, it is feasible that an account is credited without a corresponding withdrawal or alternatively, that a withdrawal occurs, without a corresponding credit. It may therefore be preferable that an entire transaction is rejected outright rather than completing partially. Thus, continuing with the example above, if both the withdrawal and the credit are not successful, then both are rejected or prevented, rather than allowing for a partially successful transaction.

Data stored within a database is said to be persistent when it is written to the database and then committed to the database, thus making the data available for later retrieval. Some data is persistent by its nature and is thus is kept persistently. Other data is transient by nature, and thus, its usefulness is fleeting, and the data is soon discarded. For example, a persistent record of a successful withdrawal and credit from the above example may be kept. However, a message or instruction to perform a particular action may be transient, and need not be retained once the message or instruction has been completed.

Using a database to store transient data such as messages and instructions dispatched by a messaging system burdens the database system with a computational load, particularly in an on-demand system responsible for a large number of varied tasks. For example, using the database system for transient data may include enqueuing a message or instruction for an action to be taken into a database, inserting a record having the transient data necessary to perform the message or instruction into the database, and then once message or instruction is completed, removing the record of transient data from the database as it is no longer needed, and dequeuing the message or instruction from the database. The database provides transactional atomicity but the computational burden on the database will increase as the number of messages and transactions increases.

A messaging system which does not utilize a database to ensure transactional atomicity either lacks transactional atomicity or must implement complex mechanisms to ensure atomicity, such as a two phase commit or distributed transaction.

It may be desirable to unload computational burden from such a database and also negate the need for messaging systems which implement complex mechanisms to ensure atomicity. The present state of the art may therefore benefit from the methods, systems, and apparatuses for supporting transactional message handling in an on-demand service environment as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 11 is a flow diagram illustrating a method for supporting transactional message handling in an on-demand service environment in accordance with disclosed embodiments; and FIG. 12 illustrates a diagrammatic representation of a machine in the exemplary form of a computer system, in accordance with one embodiment.

DETAILED DESCRIPTION

Figure 1:
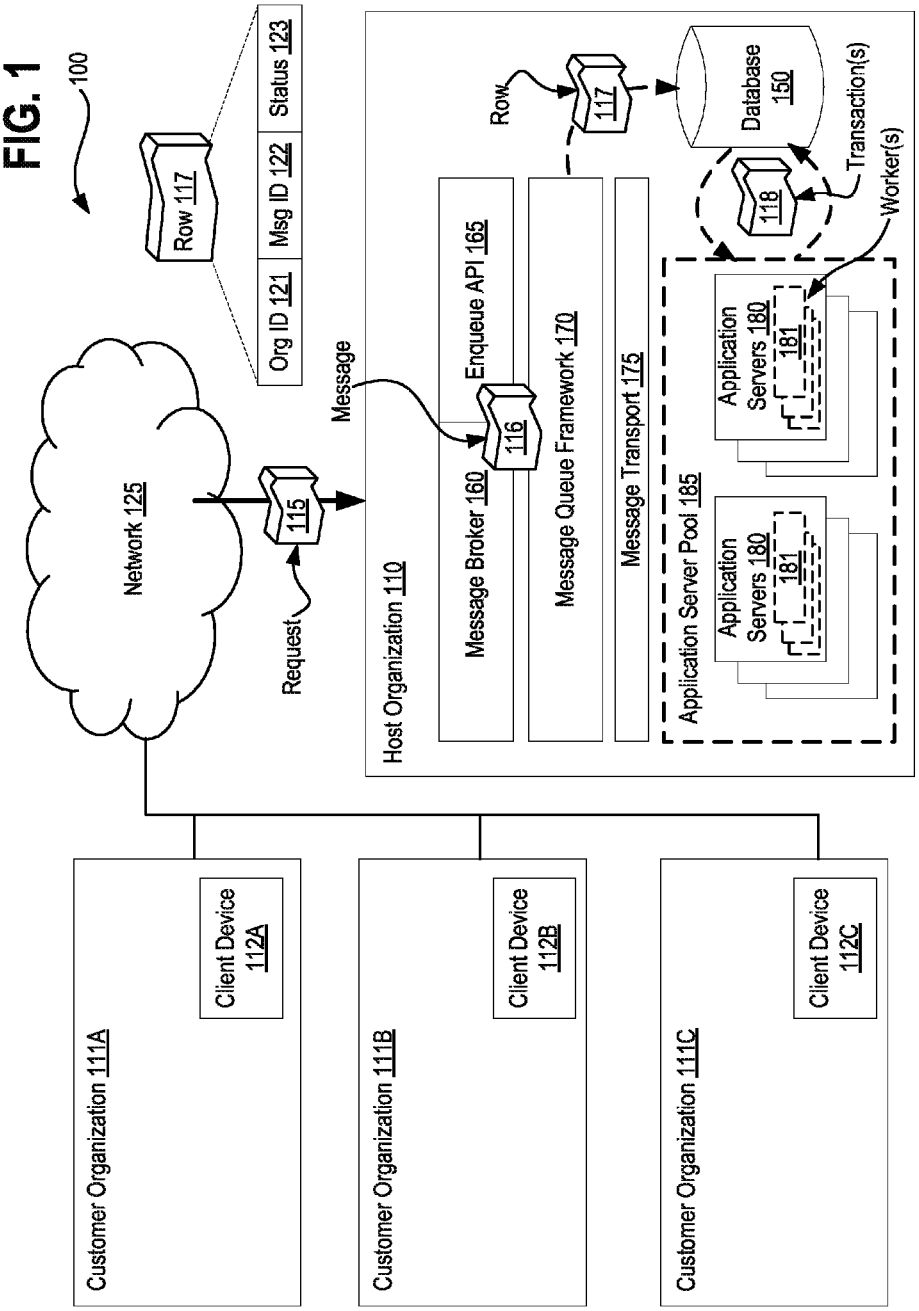
FIG. 1 depicts an exemplary architectural overview of the environment in which embodiments may operate including interrelationships of the customer organizations with the host organization depicted.

Described herein are systems, devices, and methods for supporting transactional message handling in an on-demand service environment.

In one embodiment, such mechanisms include: enqueuing a message specifying a transaction to be processed via a host organization; inserting a row into a database of the host organization associating the message with a status of pending, wherein the row is autocommitted to the database upon insertion; updating the status for the row to ready if a commit operation for the transaction is initiated; requesting a lock on the row; and performing final processing for the transaction based on the status for the message and based further on whether the lock is obtained for the row. Final processing may include, for example, a transaction roll back, a transaction commit, a transaction requeue, a termination of further transaction processing, or an orphaned transaction clean up.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 depicts an exemplary architectural overview 100 of the environment in which embodiments may operate including interrelationships of the customer organizations with the host organization depicted. Architecture 100 depicts a host organization 110 communicably interfaced with several customer organizations (111A, 111B, and 111C) via network 125. Within the host organization 110 is a message broker 160 and a connected enqueue API (Application Programming Interface) 165, a message queue framework 170, a message transport 175, and a database 150. Additionally depicted is an application server pool 185 having multiple application servers 180 therein, each having one or more workers 181, for example, execution threads capable to perform computational tasks on behalf of the host organization 110. The various customer organizations 111A-C each include at least one client device, depicted as 112A, 112B, and 112C respectively.

In accordance with one embodiment, a message 116 specifying a transaction 118 is enqueued to be processed via the host organization 110; a row 117 is inserted into a database 150 of the host organization 110 associating the message 116 with a status of pending and the row 117 is autocommitted to the database 150 upon insertion. In accordance with such an embodiment, the status for the row 117 is updated to ready if a commit operation for the transaction 118 is initiated but remains as pending absent the initiation of such a commit operation. In accordance with this embodiment, a lock on the row 117 is requested, and the host organization 110 performs final processing for the transaction 118 based on the status for the message 116 and based further on whether the lock is obtained for the row 117.

For example, final processing may include performing a transaction roll back, performing a transaction commit, performing a transaction requeue, performing transaction processing termination, or performing a clean up operation for one or more orphaned transactions.

In accordance with one embodiment, the message broker 160 enqueues the message 116 via the enqueue API 165 on behalf of a requesting application or on behalf of a requesting client device 112A-C. For example, client devices 112A-C may submit requests 115 to the host organization 110 for processing, triggering the message broker 160 to enqueue message 116. In one embodiment, the message queue framework 170 inserts the row 117 into the database and causes the database to autocommit the row 117 to the database 150 upon insertion. For example, the message queue framework 170 may implement an out-of-band commit operation to ensure the row is inserted and committed to the database regardless of whether further processing occurs.

In accordance with one embodiment, message 116 is received at the message queue framework 170 of the host organization 110 from the message broker 160 and the message queue framework 170 responsively inserts the row 117 into database 150 of the host organization 110 instructing the database 150 to autocommit the row 117 upon insertion.

In one embodiment, the message broker 160 lacks native transactional atomicity. For example, the message broker may be a turn-key messaging application which provides basic messaging services but lacks complex mechanisms to ensure transactional atomicity. For example, the message broker 160 may not natively implement two-phase commit processing, distributed transactions, or other mechanisms to ensure transactional atomicity. In such an embodiment, the host organization 110 and the message queue framework 170 operate with no expectation or requirement that the message broker 160 be aware of distributed transactions, support such distributed transactions, or utilize a two-phase commit process. In such a way, it is possible to utilize a less complex messaging system within the host organization than messaging systems which natively support transactional atomicity.

Practice of the disclosed embodiments may therefore enable a more simplistic messaging system to be utilized while also off-loading computational burden from a database 150 which no longer must store transient data. For example, although a row 117 is inserted into the database, the message 116 itself is not required to be stored by the database 150. Data which must be persistently stored, such as the creation of an account, may be stored by the database, whereas fleeting information such as the need to create the account need not be imposed upon the database 150. Further still, transactional atomicity is ensured and various failure modes are tolerated, thus ensuring a more resilient operational environment.

In accordance with one embodiment, the message queue framework 170 intercepts the message 116 enqueued at an enqueue API 165 of the message broker 160 and triggers the row 117 insertion responsive to receiving the message 116 through the interception.

In one embodiment, the message 116 is dispatched to a worker 181 to process the transaction 118 specified by the message 116. The message queue framework 170 may facilitate the dispatch into the application server pool 185 via the message transport 175. In one embodiment the message queue framework 170 enqueues multiple messages 116 and the message transport 175 performs the dispatch, or a dedicated dispatcher retrieves queued messages 116 and dispatches them into the application server pool 185. In one embodiment, the workers 181 within the application server pool 185 request a queued message 116 for dispatch.

In accordance with one embodiment, the worker 181 having received a message 116 for processing requests a lock on the row 117. For example the worker 181 may request a mutually exclusive lock or request a lock for update, thus attempting to establish exclusive authority over the row 117 corresponding to the received message 116. Requesting a lock for a row 117 does not, however, guarantee that the lock will be obtained as will be described in further detail below.

In accordance with one embodiment, the worker 181 implements or performs the final processing for a message and the corresponding transaction specified by a message. Final processing may take various forms, including, performing a transaction roll back, performing a transaction commit, performing a transaction requeue, terminating further processing for a transaction, and performing a transaction clean up operation for orphaned messages.

In accordance with one embodiment, the worker 181 assigned or dispatched with a message and specified transaction performs one or more of the following operations: the worker 181 requests the lock on a row 117, the worker 181 determines that a lock was successfully obtained, the worker 181 processes the transaction 118 specified by the message 116 responsive to obtaining the lock, the worker 181 updates the status for the row 117 to ready responsive to successfully completing processing the transaction 118, the worker 181 marks the row 117 for deletion, and the worker 181 initiates a commit operation to simultaneously commit the processed transaction 118 to the database 150 and commit deletion of the row 117 from the database 150. Thus, the transaction 118 may be successfully processed, committed, rendering the row 117 as no longer necessary. In such an embodiment, the message 116 is processed by committing a deletion of the row 117 to the database.

In one embodiment, dispatching the message 116 to a worker 181 includes: communicating the message 116 via the message transport 175 to the worker 181 to perform the final processing. In one embodiment, the worker 181 corresponds to or implements an execution thread within one of a plurality of application servers 180 of the host organization 110 to perform the processing.

As depicted, row 117 which is inserted into the database 150 includes multiple fields. In one embodiment, row 117 includes at least three fields: a first field for an organization identifier (OrgID) 121 associated with the message 116; a second field for a message tracker identifier (MsgID) 122 to uniquely identify the message 116 among a plurality of messages 116; and a third field for the status 123. Where the message 116 is not associated with a particular customer organization 111A-C, an null value, empty field, or other placeholder may be used to indicate a lack of customer organization 111A-C context with respect to the message 116 and its specified transaction 118.

Figure 2:
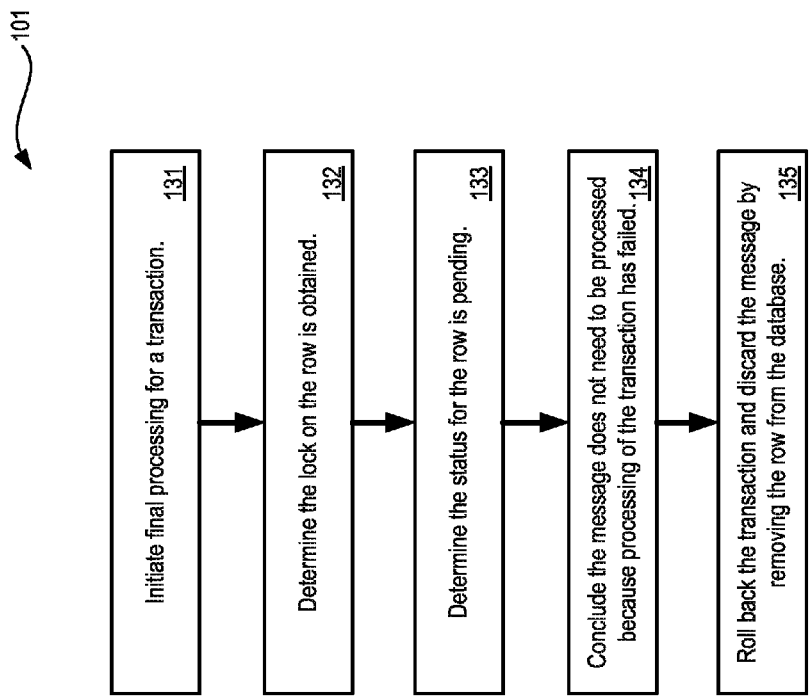
FIG. 2 depicts further processing operations in accordance with which embodiments may operate including operations to roll back the transaction and discard the message by removing the row from the database.

FIG. 2 depicts further processing operations 101 in accordance with which embodiments may operate including operations to roll back the transaction and discard the message by removing the row from the database. Some of the blocks and/or operations listed below in the following sequence of figures are optional in accordance with certain embodiments. The numbering of the blocks presented is for the sake of clarity and is not intended to prescribe an order of operations in which the various blocks must occur.

As depicted, the host organization initiates final processing (block 131), for example, via resources within an application server pool such as a worker or a work execution thread. In one embodiment, performing final processing for the transaction includes: performing a first determination that the lock on the row is obtained (block 132); performing a second determination that the status for the row is pending (block 133); and rolling back the transaction and discarding the message by removing the row from the database (block 135) based on the first and second determinations (blocks 132 and 133). In one embodiment, the first and second determinations (blocks 132 and 133) collectively indicate the message does not need to be processed because processing of the transaction has failed and processing logic of the host organization draws such a conclusion (block 134).

Figure 3:
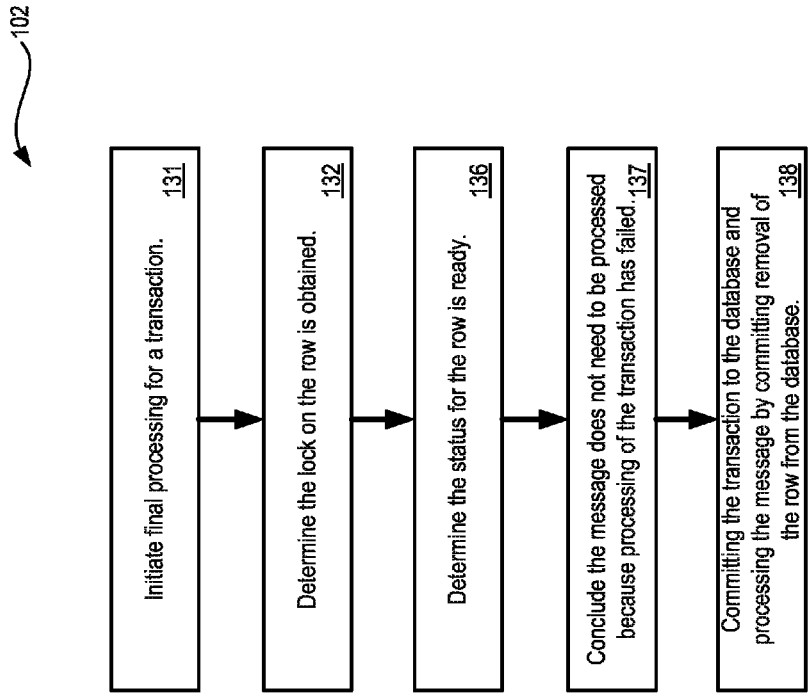
FIG. 3 depicts alternative further processing operations in accordance with which embodiments may operate including operations for committing the transaction to the database and processing the message by committing removal of the row from the database.

FIG. 3 depicts alternative further processing operations 102 in accordance with which embodiments may operate including operations for committing the transaction to the database and processing the message by committing removal of the row from the database. As depicted, the host organization initiates final processing (block 131) including: performing a first determination that the lock on the row is obtained (block 132); performing a second determination that the status for the row is ready (block 136); and committing the transaction to the database and processing the message by committing removal of the row from the database (block 138). In one embodiment, the first and second determinations (blocks 132 and 136) collectively indicate the processing of the transaction has completed successfully and the message may be processed and processing logic of the host organization draws such a conclusion (block 137).

In one embodiment, committing the transaction to the database and processing the message (block 138) includes marking the row for deletion, and simultaneously committing the transaction to the database and committing the deletion of the row to maintain transactional atomicity.

Figure 4:
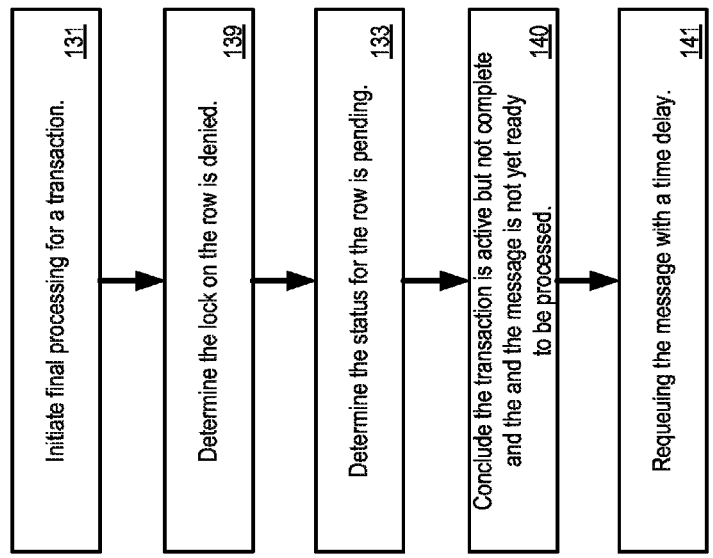
FIG. 4 depicts alternative further processing operations in accordance with which embodiments may operate including operations for concluding the transaction is active but not complete and the and the message is not yet ready to be processed and requeuing the message with a time delay.

FIG. 4 depicts alternative further processing operations 103 in accordance with which embodiments may operate including operations for concluding the transaction is active but not complete and the and the message is not yet ready to be processed and requeuing the message with a time delay. As depicted, the host organization initiates final processing (block 131) including: performing a first determination that the lock on the row is denied (block 139); performing a second determination that the status for the row is pending (block 133); and requeuing the message with a time delay (block 141). In one embodiment, requeuing the message (block 141) includes the host organization scheduling to reinitiate performing the final processing for the transaction (block 131) after the time delay.

In one embodiment, the first and second determinations (blocks 139 and 133) collectively indicate that the processing of the transaction is active but not complete and the and the message is not yet ready to be processed and processing logic of the host organization draws such a conclusion (block 140).

Figure 5:
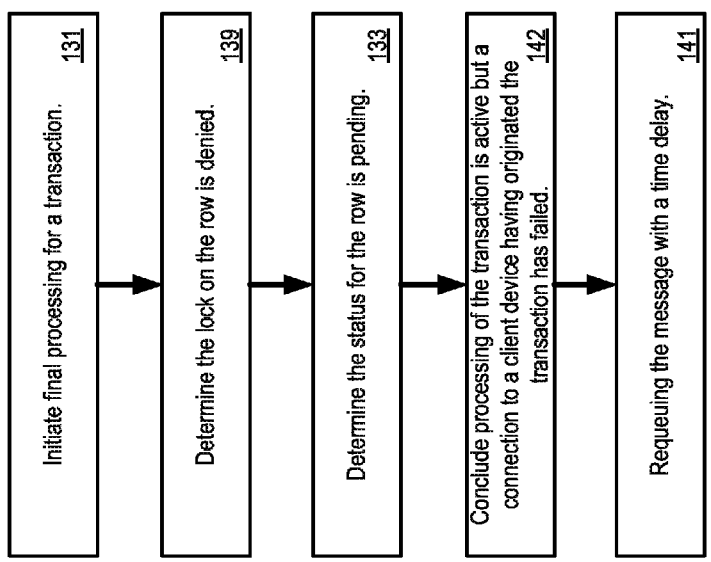
FIG. 5 depicts alternative further processing operations in accordance with which embodiments may operate including operations for concluding processing of the transaction is active but a connection to a client device having originated the transaction has failed and requeuing the message with a time delay.

FIG. 5 depicts alternative further processing operations 104 in accordance with which embodiments may operate including operations for concluding processing of the transaction is active but a connection to a client device having originated the transaction has failed and requeuing the message with a time delay. As depicted, the host organization initiates final processing (block 131) including: performing a first determination that the lock on the row is denied (block 139); performing a second determination that the status for the row is pending (block 133); and requeuing the message with a time delay (block 141). In one embodiment, requeuing the message (block 141) includes the host organization scheduling to reinitiate performing the final processing for the transaction (block 131) after the time delay.

In one embodiment, the first and second determinations (blocks 139 and 133) collectively indicate that processing of the transaction is active but a connection to a client device having originated the transaction has failed and processing logic of the host organization draws such a conclusion (block 142).

In one embodiment, requeuing the message 116 with a time delay enables an application server processing the transaction to: (a) maintain exclusive authority for processing the transaction; (b) complete processing of the transaction; and (c) initiate the commit operation. In one embodiment, the commit operation includes the application server: marking the row for deletion, and simultaneously committing the transaction to the database and committing the deletion of the row to maintain transactional atomicity.

For example, it is possible that a message broker receives a request and enqueues an appropriate message to undertake processing of a transaction responsive to the request, but then loses a connection to a requesting client device. This may occur if the client device crashes, goes off-line, or due to other causes. Where that message is dispatched and is being actively processed, it may be acceptable for the processing to complete and commit to the database. The message broker may attempt to notify the requestor later, or simply complete the processing and commit the successful result.

By requeuing the message with a time delay (block 141), the active processing is allowed to complete, without a worker thread attempting to concurrently duplicate the processing for a given transaction. After the time delay, the status may be re-checked to determine what, if any, further processing is required. For example, if the client device or the message broker were to re-request the same transaction be processed, that second erroneous transaction is prevented from processing so long as the original application server or worker maintained its lock on the TOW.

Thus, in accordance with one embodiment, subsequent to requeuing the message, the host organization reinitiates performing the final processing for the transaction (e.g., by returning to block 131) after the time delay.

Figure 6:
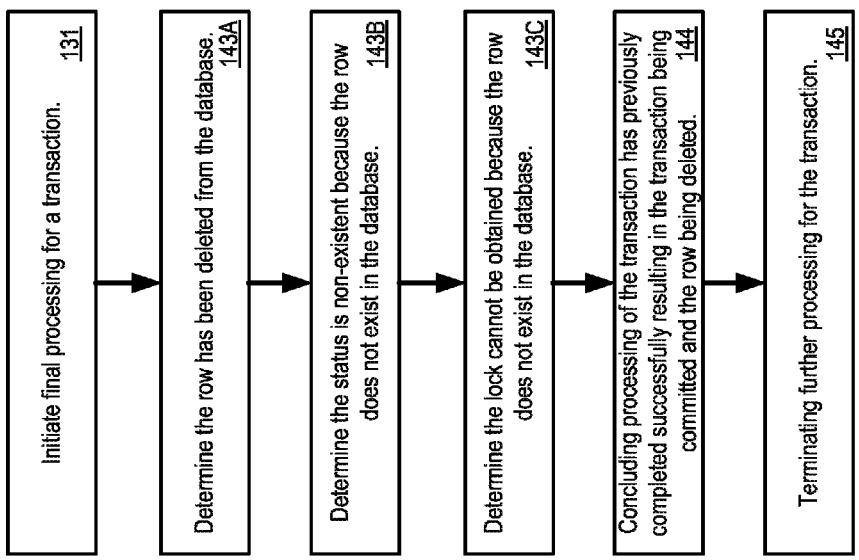
FIG. 6 depicts alternative further processing operations in accordance with which embodiments may operate including operations for concluding processing of the transaction has previously completed successfully resulting in the transaction being committed and the row being deleted and terminating further processing for the transaction.

FIG. 6 depicts alternative further processing operations 105 in accordance with which embodiments may operate including operations for concluding processing of the transaction has previously completed successfully resulting in the transaction being committed and the row being deleted and terminating further processing for the transaction. As depicted, the host organization initiates final processing (block 131) including: determining the row has been deleted from the database (block 143A); and terminating further processing for the transaction (block 145) based on the determination that the row has been deleted from the database.

In one embodiment, performing final processing for the transaction (block 131) includes: determining that the status is non-existent (143B) and that the lock cannot be obtained (143C) because the row does not exist in the database; and terminating all further processing for the transaction (145) based on the row not existing in the database.

In one embodiment, determining that the status is non-existent and that the lock cannot be obtained because the row does not exist in the database (blocks 143A-C) collectively indicate that the processing of the transaction has previously completed successfully resulting in the transaction being committed and the row being deleted and processing logic of the host organization draws such a conclusion (block 144).

For example, because the row is autocommitted, it is guaranteed to exist in the database when the message is enqueued. Therefore, it is acceptable to conclude that the absence of the row for an enqueued message is the result of the row being inserted with a pending status, advanced to a ready status, and then deleted as a result of a commit operation triggered responsive to successful processing for such a transaction.

In accordance with one embodiment, an enqueued message specifying the transaction to be processed is determined to be an erroneous message. For example, the message may be deemed to be a duplicate or a redundant message for a transaction that has already successfully processed based on the determination that the row has been deleted from the database (block 143A).

Figure 7:
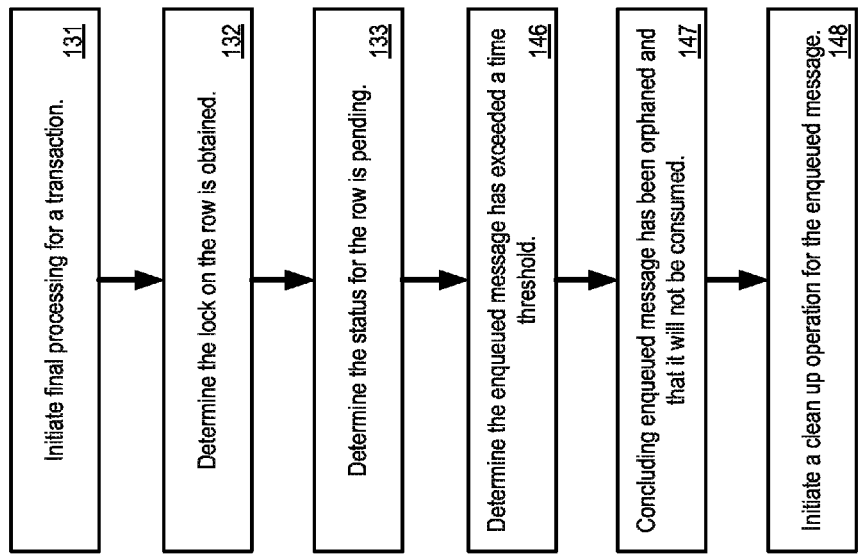
FIG. 7 depicts alternative further processing operations in accordance with which embodiments may operate including operations for initiating a clean up operation for the enqueued message.

FIG. 7 depicts alternative further processing operations 106 in accordance with which embodiments may operate including operations for initiating a clean up operation for the enqueued message. As depicted, the host organization initiates final processing (block 131) including: performing a first determination that the lock on the row is available or is obtained (block 132); performing a second determination that the status for the row is pending (block 133); and performing a third determination that the enqueued message has exceeded a time threshold (146). For example, an expiration threshold may be utilized for tracking enqueued transactions and total queue time for a message may be tracked regardless of whether the message has been requeued.

Based on the first, second, and third determinations (blocks 132, 133, and 146) a clean up operation for the enqueued message is initiated (block 148). In one embodiment, the first, second, and third determinations (blocks 132, 133, and 146) collectively indicate that the enqueued message has been orphaned and that it will not be consumed and processing logic of the host organization draws such a conclusion (block 147).

In accordance with one embodiment, the clean up operation (block 148) includes discarding the message by removing the row from the database and committing the deletion of the row.

In accordance with one embodiment, the host organization initiates a clean up operation (block 148) on a repeating periodic basis. For example, a cron job or similar administrative function may be utilized to automatically trigger the clean up operation on a periodic basis. In one embodiment, the clean up operation includes: identifying a set of one or more enqueued orphan messages based on each of the one or more enqueued orphan messages meeting the following criteria: determining that a row corresponding to the enqueued orphan message is not locked (e.g., block 132 in which it is determined that a lock for a row is available or obtained); determining the row corresponding to the enqueued orphan message has a status of pending (block 133); and determining the enqueued orphan message has been enqueued for a time period in excess of a threshold (block 146).

Orphaned messages may occur due to the autocommit instruction for the row insertion. For example where a message is enqueued and a row is responsively inserted and autocommitted, it is feasible that no further action is taken because, for example the message broker crashes or loses connectivity or some other error occurs which prevents the receipt and fulfillment of further required information or events necessary for proceeding with processing of the transaction. Thus, a message will exist in the queue, yet there will be no mechanism by which the message is naturally consumed. For example, the message is not being actively serviced and is not being dispatched, and thus, after a predetermined period of time, the clean up operation engages to delete the orphaned message.

Figure 8:
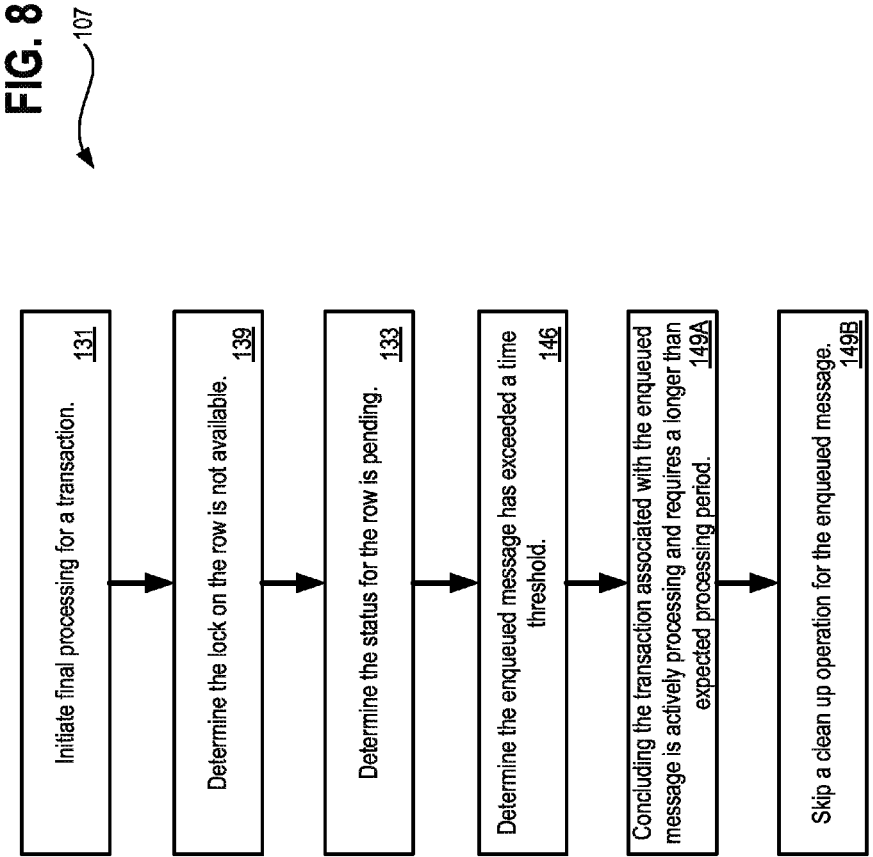
FIG. 8 depicts alternative further processing operations in accordance with which embodiments may operate including operations for skipping a clean up operation for the enqueued message.

FIG. 8 depicts alternative further processing operations 107 in accordance with which embodiments may operate including operations for skipping a clean up operation for the enqueued message. As depicted, the host organization initiates final processing (block 131) including: performing a first determination that the lock on the row is not available (block 139, e.g., the lock is denied); performing a second determination that the status for the row is pending (block 133); and performing a third determination that the enqueued message 116 has exceeded a time threshold (block 146). In such an embodiment, final processing skips a clean up operation for the enqueued message (149B) based on the first, second, and third determinations (blocks 139, 133, and 146).

In one embodiment, the first, second, and third determinations (blocks 139, 133, and 146) collectively indicate that the transaction associated with the enqueued message is actively processing and requires a longer than expected processing period and processing logic of the host organization draws such a conclusion (block 149A).

Thus, although an expiration period has been exceeded, processing may be permitted to continue (e.g., by skipping the clean up operation for the enqueued message as in block 149B). Eventually the transaction will successfully complete, commit, and cause the message to be processed triggering removal of the row.

Figure 9:
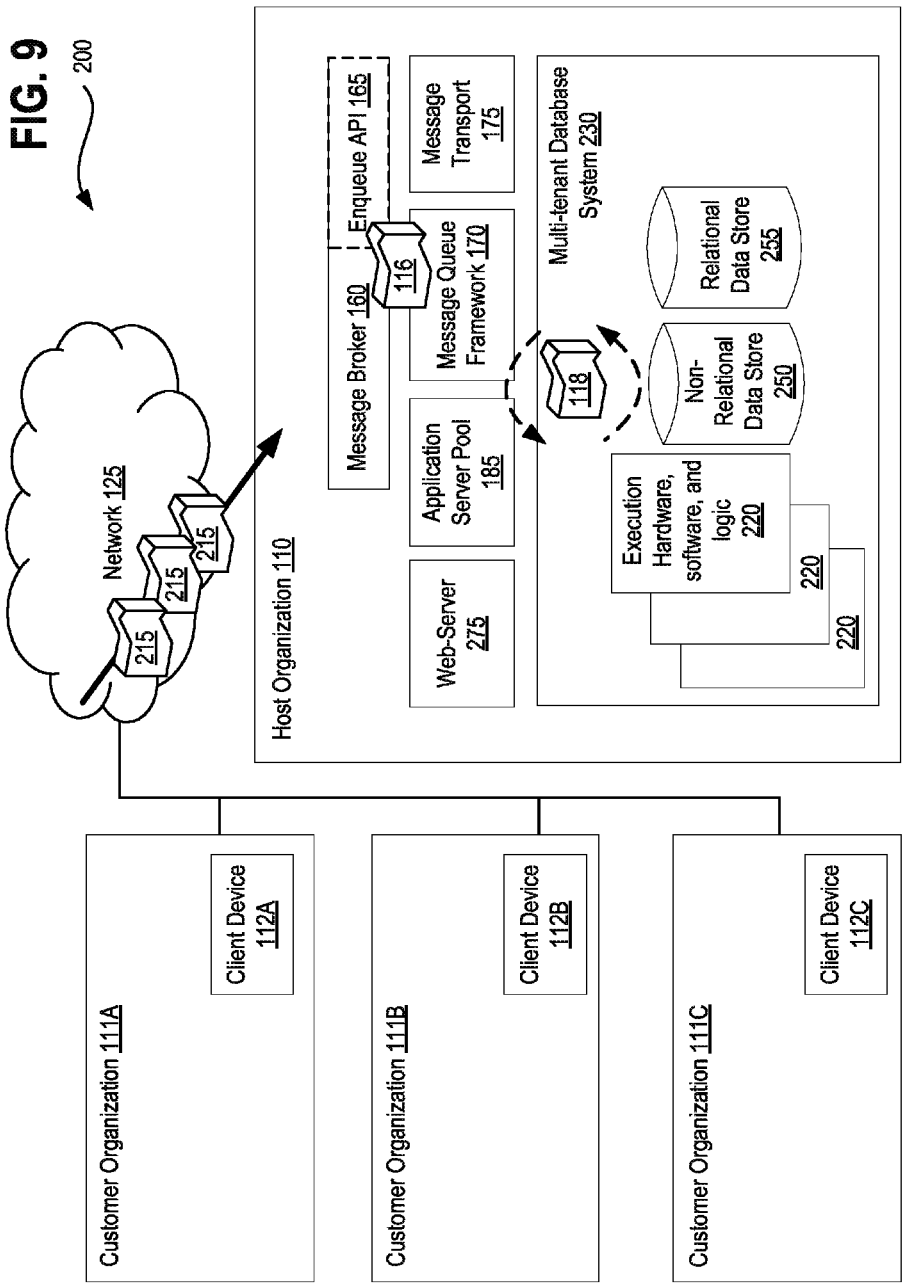
FIG. 9 depicts an alternative exemplary architectural overview of the environment in which embodiments may operate.

FIG. 9 depicts an alternative exemplary architectural overview of the environment 200 in which embodiments may operate.

In one embodiment, the database is communicably interfaced with a plurality of client devices 112A-C through the host organization 110. In one embodiment, the database of the host organization 110 as set forth at FIG. 1 includes or implements a multi-tenant database system 230 within the host organization as is depicted in the embodiment of FIG. 2. In such an embodiment, the host organization 110 receives a plurality of requests 215 from a plurality of customer organizations 111A-C. For example, the incoming requests 215 solicit processing by the host organization via the multi-tenant database system 230, thus triggering the message broker 160 and message queue framework 170 to operate collectively with the various described elements to enqueue an appropriate message 116 and initiate appropriate processing of a specified transaction 118 corresponding to the enqueued message 116.

In one embodiment, each customer organization 111A-C is an entity selected from the group consisting of: a separate and distinct remote organization, an organizational group within the host organization 110, a business partner of the host organization 110, or a customer organization 111A-C that subscribes to cloud computing services provided by the host organization 110.

Multi-tenant database system 230 includes a plurality of underlying hardware, software, and logic elements 220 that implement database functionality and a code execution environment within the host organization 110. In accordance with one embodiment, multi-tenant database system 230 implements a non-relational data store 250 and a relational data store 255. The hardware, software, and logic elements 220 of the multi-tenant database system 230 are separate and distinct from a plurality of customer organizations (111A, 111B, and 111C) which utilize the services provided by the host organization 110 by communicably interfacing to the host organization 110 via network 125. In such a way, host organization 110 may implement on-demand services, on-demand database services or cloud computing services to subscribing customer organizations 111A-C.

Thus, in accordance with one embodiment, the multi-tenant database system 230 implements hardware and software 220 elements that are shared by a plurality of separate and distinct customer organizations 111A-C, each of the separate and distinct customer organizations being remotely located from the host organization 110 having the multi-tenant database system 230 operating therein.

In one embodiment, requests 215 are received at, or submitted to, a web-server 275 within host organization 110. Host organization 110 may receive a variety of requests 215 for processing by the host organization 110 and its multi-tenant database system 230, including the solicitation of services and transactions 118 which require the creation and enqueuing of messages 116. Such requests 215 may be received from one or more of the plurality of customer organizations 111A-C via the network 125. Incoming requests 215 received at web-server 275 may specify which services or transactions 118 from the host organization 110 are to be provided, such as query requests, search request, status requests, data base transactions, a processing request to retrieve, update, or store data on behalf of one of the customer organizations 111A-C, and so forth. Web-server 275 may be responsible for receiving data requests 215 from various customer organizations 111A-C via network 125 and provide a web-based interface to an end-user client machine originating such data requests 215, for example, a client computing device at or operating within a customer organization 111A-C.

In accordance with one embodiment, a non-transitory computer readable storage medium stores instructions that, when executed by a system in a host organization 110, for example, when executed by a processor and memory of such a system, the instructions cause the system to perform operations including: enqueuing a message 116 specifying a transaction 118 to be processed via the host organization 110; inserting a row 117 into a database 150 of the host organization 110 associating the message 116 with a status of pending. In one embodiment, the row 117 is autocommitted to the database 150 upon insertion; updating the status for the row 117 to ready if a commit operation for the transaction 118 is initiated; requesting a lock on the row 117; and performing final processing for the transaction 118 based on the status for the message 116 and based further on whether the lock is obtained for the row 117.

In accordance with one embodiment, the stored instructions, when executed, cause the system to perform further operations including: performing final processing for the transaction 118 by performing a first determination that the lock on the row 117 is not available; and dispatching the message 116 to a worker within the application server pool 185 to process the transaction 118 specified by the message 116. In one embodiment, such a worker performs the following operations: the worker requests the lock; and the worker performs final processing for the transaction specified by the message 116 responsive to obtaining the lock by updating the status for the row 117 to ready responsive to successfully completing processing the transaction 118. The worker further marks the row 117 for deletion; and the worker initiates the commit operation to simultaneously commit the processed transaction 118 to the database and commit deletion of the row 117 from the database.

Figure 10:
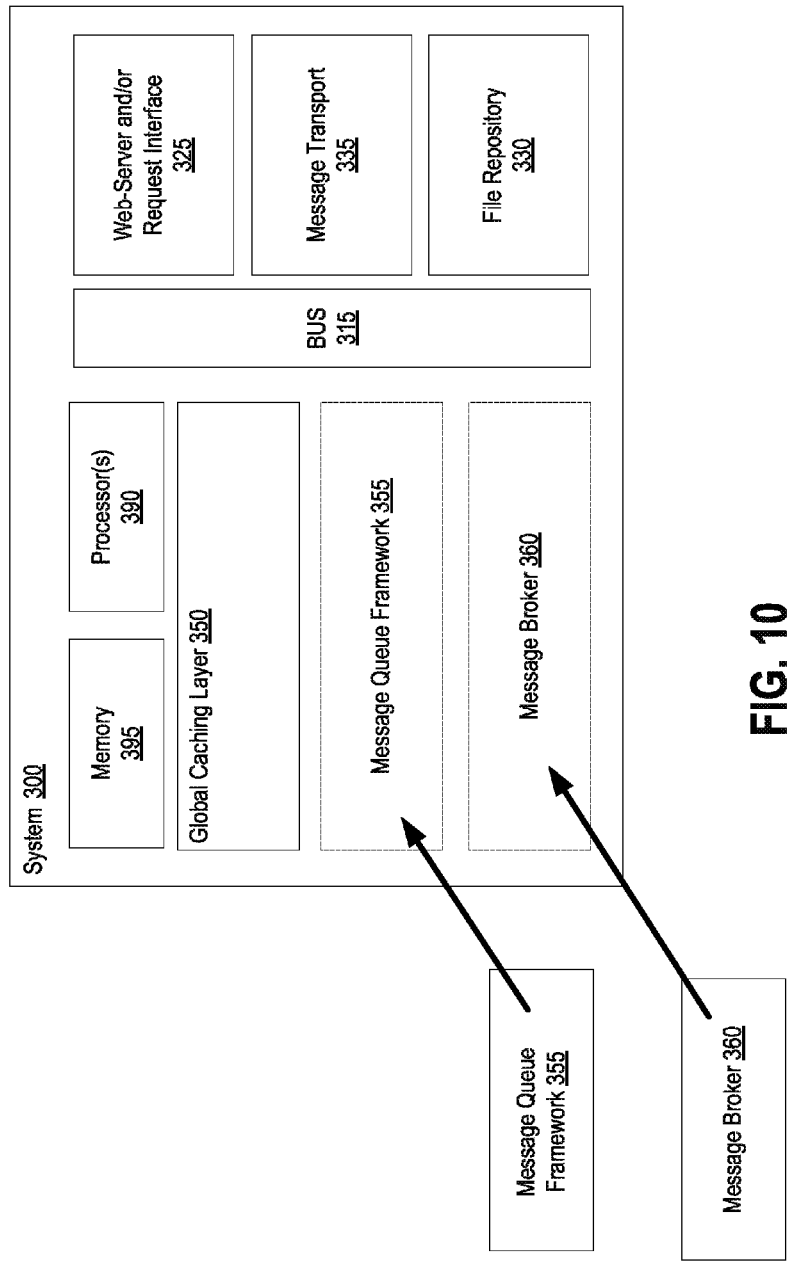
FIG. 10 shows a diagrammatic representation of a system in which embodiments may operate, be installed, integrated, or configured.

FIG. 10 shows a diagrammatic representation of a system 300 in which embodiments may operate, be installed, integrated, or configured.

In one embodiment, system 300 includes a memory 395 and a processor or processors 390. For example, memory 395 may store instructions to be executed and processor(s) 390 may execute such instructions. System 300 includes bus 315 to transfer transactions and data within system 300 among a plurality of peripheral devices communicably interfaced with bus 315. System 300 further includes web-server and/or request interface 325, for example, to receive requests including those soliciting or specification transactions to be processed, to return responses, and to otherwise interface with remote clients, such as client devices located within customer organizations 111A-C. Web-server and/or request interface 325 may operate as a request interface to receive instructions, messages, transaction requests and so forth on behalf of the host organization in which the system 300 operates. Some requests received at web-server 325 may be transaction requests to be transacted against a multi-tenant database system communicably interfaced with the host organization in which the system 300 operates.

System 300 is further depicted as having a message transport 335 to communicate and dispatch messages to connected execution resources, such as workers, application servers, an application server pool, etc. System 300 includes file repository 330 to provide storage as necessary for the system 300. System 300 further includes global caching layer 350 to provide caching services to communicably interfaced devices and systems.

Distinct within system 300 is a message broker 360 and message queue framework 355, either or both of which may be installed into system 300 or exist separate from system 300, either or both of which may further be hardware based, such that each is enabled by the hardware of system 300 in conjunction with the system 300's processor(s) 390 and memory 395 to carry out the described capabilities.

Thus, in accordance with one embodiment, such a system 300 includes a processor 390 to execute instructions; a request interface 325 to receive a request from a client device; a message broker 360 to enqueue a message specifying a transaction to be processed via the system 300; and a message queue framework 355 to insert a row into a database communicably interfaced with the system. In one embodiment, the row associates the message with a status of pending. In one embodiment, the message queue framework 355 further autocommits the row to the database upon insertion. In one embodiment, system 300 includes a message transport 335 to dispatch the message to a worker thread in one of a plurality of application servers communicably interfaced with the system 300. In one embodiment, the worker thread or an equivalent execution resource updates the status for the row to ready if a commit operation for the transaction is initiated; requests a lock on the row; and performs final processing for the transaction based on the status for the message and based further on whether the lock is obtained for the row.

In one embodiment, the worker thread performs final processing for the transaction by performing one or more of the following: (a) the worker thread to rollback the transaction and discard the message when the lock on the row is obtained and the status for the row is pending; (b) the worker thread to commit the transaction to the database and process the message by committing removal of the row from the database when the lock on the row is obtained and the status for the row is ready; (c) the worker thread to requeue the message with a time delay and schedule the system to reinitiate performing the final processing for the transaction after the time delay when the lock on the row is denied and the status for the row is pending; (d) the worker thread to terminate all further processing for the transaction when the status is non-existent and the lock cannot be obtained because the row does not exist in the database; and (e) the worker thread to initiate a clean up operation for the enqueued message when the lock on the row is available and the status for the row is pending and the enqueued message has exceeded a time threshold.

In one embodiment, the system 300 further includes a web-server 325 to implement the request interface to receive the request from the client device. In one embodiment, a multi-tenant database system implements the database and is communicably interfaced with the system.

FIG. 11 is a flow diagram illustrating a method 400 for supporting transactional message handling in an on-demand service environment in accordance with disclosed embodiments. Method 400 may be performed by processing logic that may include hardware (e.g., circuitry, dedicated logic, programmable logic, microcode, etc.), software (e.g., instructions run on a processing device to perform various operations such receiving, storing, enqueuing, requeuing, deleting, committing, and transmitting information and data in pursuance of supporting transactional message handling, or some combination thereof. In one embodiment, method 400 is performed by a hardware based system, such as system 300 set forth at FIG. 10. Some operations may be performed by a message queue framework, by a message broker, by a message transport, by workers and computational resources available, or some combination thereof, as set forth within system 300 of FIG. 10. Some of the blocks and/or operations listed below are optional in accordance with certain embodiments. The numbering of the blocks presented is for the sake of clarity and is not intended to prescribe an order of operations in which the various blocks must occur.

Method 400 begins with processing logic for receiving a message specifying a transaction to be processed via a host organization (block 405).

At block 410, processing logic enqueues the message.

At block 415, processing logic inserts a row into a database of the host organization associating the message with a status of pending.

At block 420, processing logic autocommits the row to the database upon insertion.

At block 425, processing logic dispatches the message to a worker to process the transaction specified by the message.

At block 430, processing logic updates the status for the row to ready if a commit operation for the transaction is initiated.

At block 435, processing logic requests a lock on the row.

At block 440, processing logic determines status for the message from the row in the database.

At block 445, processing logic performs final processing for the transaction based on the status for the message and based further on whether the lock is obtained for the row. For example, final processing may include: a transaction roll back, a transaction commit, a transaction requeue, a termination of transaction processing, an orphaned transaction clean up, skipping a scheduled clean up operation, and so forth. Such operations are set forth in detail above with reference to FIGS. 2, 3, 4, 5, 6, 7, and 8.

FIG. 12 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes a message broker 523 and a message queue framework 524. Main memory 504 and its sub-elements (e.g. 523 and 524) are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method in a host organization having at least a processor and a memory therein, the method comprising:
   enqueuing a message into a message queue framework of the host organization, the message specifying a transaction to be processed via the host organization, the transaction comprising at least a row to be inserted into a database of the host organization;
   inserting the row into the database of the host organization via the message queue framework, wherein a status for the row inserted into the database remains pending absent initiation of a commit operation for the row;
   initiating, via the message queue framework, the commit operation for the row inserted into the database upon insertion of the row into the database regardless of whether any further processing occurs;
   requesting a lock on the row inserted into the database;
   concluding the transaction failed or processed successfully based on whether the lock requested on the row is obtained or denied and based further on whether the status for the row is pending or ready by determining whether the enqueued message has been orphaned and will not be consumed based on whether the lock on the row is available, whether the status for the row is pending, and whether the enqueued message has exceeded a time threshold; and
   initiating a clean up operation for the enqueued message based on the determining whether the enqueued message has been orphaned and will not be consumed, wherein the clean up operation comprises discarding the message by removing the row from the database and committing the deletion of the row to the database.

2. The method of claim 1:
   wherein initiating, via the message queue framework, the commit operation for the row inserted into the database upon insertion of the row into the database regardless of whether any further processing occurs comprises the message queue framework implementing an out-of-band commit operation; and
   wherein concluding the transaction failed comprises the row not successfully committing to the database responsive to the out-of-band commit operation and retaining a status of pending.

3. The method of claim 1, further comprising:
   performing a first determination that the lock on the row is obtained;
   performing a second determination that the status for the row is pending and not yet committed; and
   rolling back the transaction and discarding the message by removing the row from the database based on the first and second determinations.

4. The method of claim 3, wherein the first and second determinations collectively indicate the message does not need to be processed because processing of the transaction has failed.

5. The method of claim 1, further comprising:
   performing a first determination that the lock on the row is obtained;
   performing a second determination that the status for the row is ready and committed; and
   processing the message by committing a removal of the row from the database.

6. The method of claim 5:
   wherein the first and second determinations collectively indicate the processing of the transaction has completed successfully, the row is committed to the database, and the message may be processed; and
   wherein processing the message by committing a removal of the row from the database comprises:
   (a) marking the row for deletion, and
   (b) committing the deletion of the row to maintain transactional atomicity.

7. The method of claim 1, further comprising:
   performing a first determination that the lock on the row is denied;
   performing a second determination that the status for the row is pending; and
   requeuing the message with a time delay, wherein requeuing the message schedules the host organization to reinitiate processing for the transaction after the time delay.

8. The method of claim 7:
   wherein requeuing the message with a time delay enables an application server processing the transaction to:
   (a) maintain exclusive authority for processing the transaction;
   (b) complete processing of the transaction; and
   (c) initiate the commit operation, wherein the commit operation comprises the application server: (1) marking the row for deletion and (2) simultaneously committing the row inserted and committing the deletion of the row to maintain transactional atomicity.

9. The method of claim 8:
   wherein the host organization reinitiates processing for the transaction after the time delay subsequent to requeuing the message; and
   wherein the reinitiated processing for the transaction after the time delay is terminated contingent on a determination that the row has been deleted from the database.

10. The method of claim 1, wherein the method further comprises:
    determining that the status of the row inserted is non-existent and that the lock cannot be obtained because the row does not exist in the database; and
    dequeuing the message from the message queue framework to prevent further processing associated with the transaction specified by the message.

11. The method of claim 10:
    wherein determining that the status is non-existent and that the lock cannot be obtained because the row does not exist in the database collectively indicates that the processing of the transaction has previously completed successfully resulting in the transaction being committed successfully and the row being deleted successfully; and
    determining the enqueued message specifying the transaction to be processed is an erroneous message.

12. The method of claim 1, further comprising:
    performing a first determination that the lock on the row is not available;
    performing a second determination that the status for the row is pending;
    performing a third determination that the enqueued message has exceeded a time threshold; and
    skipping a clean up operation for the enqueued message based on the first, second, and third determinations.

13. The method of claim 12, wherein the first, second, and third determinations collectively indicate that the transaction associated with the enqueued message is actively processing and requires a longer than expected processing period in excess of the time threshold.

14. The method of claim 1, further comprising:
initiating a clean up operation on a repeating periodic basis, wherein the clean up operation comprises:
identifying a set of one or more enqueued orphan messages based on each of the one or more enqueued orphan messages meeting the following criteria:
determining that a row corresponding to the enqueued orphan message is not locked;
determining the row corresponding to the enqueued orphan message has a status of pending; and
determining the enqueued orphan message has been enqueued for a time period in excess of a threshold.

15. The method of claim 1, further comprising:
receiving the message at the message queue framework of the host organization from a message broker; and
wherein inserting the row into a database of the host organization comprises the message queue framework inserting the row into the database and causing the database to autocommit the row upon insertion.

16. The method of claim 15, wherein the message broker lacks native transactional atomicity.

17. The method of claim 15, wherein receiving the message at the message queue framework comprises:
intercepting a message enqueued at an enqueue Application Programming Interface (enqueue API) of the message broker; and
triggering the row insertion responsive to intercepting the message.

18. The method of claim 15, further comprising:
dispatching the message to a worker thread to process the transaction specified by the message;
wherein requesting the lock on the row comprises the worker thread requesting the lock; and
wherein the worker thread performs at least the following operations:
the worker thread transacting the commit operation for the row inserted with the database and updating the status for the row from pending to ready responsive to successfully committing the row;
marking the row for deletion; and
committing deletion of the row from the database.

19. The method of claim 18, wherein dispatching the message to a worker comprises:
communicating, via a message transport, the message to the worker to perform its operations as an execution thread within one of a plurality of application servers within the host organization.

20. The method of claim 1, wherein the row inserted into the database comprises:
a first field for an organization identifier (OrgID) associated with the message;
a second field for a message tracker identifier to uniquely identify the message among a plurality of messages; and
a third field for the status.

21. The method of claim 1:
wherein the database of the host organization comprises a multi-tenant database system of the host organization; and
wherein enqueuing the message specifying a transaction to be processed via the host organization comprises enqueuing the message at the host organization as one of a plurality of requests received from a plurality of customer organizations, wherein each customer organization is an entity selected from the group consisting of:
a separate and distinct remote organization, an organizational group within the host organization, a business partner of the host organization, or a customer organization that subscribes to cloud computing services provided by the host organization.

22. The method of claim 21, wherein the multi-tenant database system comprises elements of hardware and software that are shared by a plurality of separate and distinct customer organizations, each of the separate and distinct customer organizations being remotely located from the host organization having the multi-tenant database system operating therein.

23. A non-transitory computer readable storage medium having instructions stored thereon that, when executed by a system in a host organization having a processor and memory therein, the instructions cause the system to perform operations comprising:
enqueuing a message into a message queue framework of the host organization, the message specifying a transaction to be processed via the host organization, the transaction comprising at least a row to be inserted into a database of the host organization;
inserting the row into the database of the host organization via the message queue framework, wherein a status for the row inserted into the database remains pending absent initiation of a commit operation for the row;
initiating, via the message queue framework, the commit operation for the row inserted into the database upon insertion of the row into the database regardless of whether any further processing occurs;
requesting a lock on the row inserted into the database;
concluding the transaction failed or processed successfully based on whether the lock requested on the row is obtained or denied and based further on whether the status for the row is pending or ready by determining whether the enqueued message has been orphaned and will not be consumed based on whether the lock on the row is available, whether the status for the row is pending, and whether the enqueued message has exceeded a time threshold; and
initiating a clean up operation for the enqueued message based on the determining whether the enqueued message has been orphaned and will not be consumed, wherein the clean up operation comprises discarding the message by removing the row from the database and committing the deletion of the row to the database.

24. The non-transitory computer readable storage medium of claim 23, wherein the instructions cause the system to perform further operations comprising:
dispatching the message to a worker thread to process the transaction specified by the message;
wherein requesting the lock on the row comprises the worker thread requesting the lock; and
wherein the worker thread performs at least the following operations:
the worker thread transacting the commit operation for the row inserted with the database and updating the status for the row from pending to ready responsive to successfully committing the row;
marking the row for deletion; and
committing deletion of the row from the database.

25. A system comprising:
a client device operating at a customer organization, the client device having a processor and a memory therein;

a host organization having a plurality of application servers therein, each having at least a processor to execute instructions;

a network communicably interfacing the client device with the host organization;

a request interface at the host organization to receive a request from the client device;

a message broker at the host organization to enqueue a message into a message queue framework of the host organization, the message specifying a transaction to be processed via the host organization, the transaction comprising at least a row to be inserted into a database of the host organization;

a message queue framework at the host organization to insert the row into the database of the host organization via the message queue framework, wherein a status for the row inserted into the database remains pending absent initiation of a commit operation for the row;

the message queue framework at the host organization further to initiate the commit operation for the row inserted into the database upon insertion of the row into the database regardless of whether any further processing is to occur;

a worker thread within one of the plurality of application servers of the host organization to request a lock on the row inserted into the database, and the worker thread to further determine the transaction failed or processed successfully based on whether the lock requested on the row is obtained or denied and based further on whether the status for the row is pending or ready by determining whether the enqueued message has been orphaned and will not be consumed based on whether the lock on the row is available, whether the status for the row is pending, and whether the enqueued message has exceeded a time threshold; and the worker thread to further initiate a clean up operation for the enqueued message based on the determining whether the enqueued message has been orphaned and will not be consumed, wherein the clean up operation comprises discarding the message by removing the row from the database and committing the deletion of the row to the database.

26. The system of claim 25, wherein the worker thread is to perform further processing for the transaction based on the status for the message and based further on whether the lock is obtained for the row, wherein the worker thread is to perform one of:

(a) rollback the transaction and discard the message when the lock on the row is obtained and the status for the row is pending indicating the row is not yet committed to the database;

(b) confirm the commit of the row to the database and process the message by committing removal of the row from the database when the lock on the row is obtained and the status for the row is ready;

(c) requeue the message with a time delay and schedule the system to reinitiate processing for the transaction after the time delay when the lock on the row is denied and the status for the row is pending;

(d) de-queue the message to prevent further processing associated with the transaction specified by the message when the status is non-existent and the lock cannot be obtained because the row does not exist in the database; and (e) initiate a clean up operation for the enqueued message when the lock on the row is available and the status for the row is pending and the enqueued message has exceeded a time threshold.

* * * * *